(12) United States Patent
Shver

(10) Patent No.: US 6,749,661 B2
(45) Date of Patent: Jun. 15, 2004

(54) METHOD FOR MELTING AND DECARBURIZATION OF IRON CARBON MELTS

(75) Inventor: Valery G. Shver, Alpharetta, GA (US)

(73) Assignee: Process Technology International, Inc., Tucker, GA (US)

( * ) Notice: Subject to any disclaimer, the term of this patent is extended or adjusted under 35 U.S.C. 154(b) by 0 days.

(21) Appl. No.: 09/875,153

(22) Filed: Jun. 5, 2001

(65) Prior Publication Data

US 2001/0043639 A1 Nov. 22, 2001

Related U.S. Application Data

(63) Continuation-in-part of application No. 09/502,064, filed on Feb. 10, 2000, now Pat. No. 6,289,035.

(51) Int. Cl.$^7$ .............................................. C21C 7/068
(52) U.S. Cl. ....................... 75/10.41; 75/10.42; 75/529; 75/554; 75/10.39; 266/268
(58) Field of Search ........................... 75/10.41, 10.39, 75/10.42, 529, 554; 266/268

(56) References Cited

U.S. PATENT DOCUMENTS

| | | | | |
|---|---|---|---|---|
| 3,459,867 A | * | 8/1969 | Estes | 373/2 |
| 3,902,889 A | * | 9/1975 | Malin | 266/222 |
| 4,168,968 A | * | 9/1979 | Udo et al. | 266/159 |
| 4,389,043 A | * | 6/1983 | Weber et al. | 266/218 |
| 4,701,216 A | * | 10/1987 | Spenceley et al. | 75/10.42 |
| 4,746,103 A | * | 5/1988 | Takashiba et al. | 266/225 |
| 5,630,713 A | * | 5/1997 | Shver et al. | 431/159 |
| 5,954,855 A | * | 9/1999 | Gitman et al. | 75/10.42 |

FOREIGN PATENT DOCUMENTS

GB 2280501 B * 10/1996 ............. C21C/5/52

OTHER PUBLICATIONS

Dennis, W. H. Metallurgy of the Ferrous Metals. p. 186. 1963 (no month).*

Electric Furnace Steelmaking, vol. I: Design, Operation, and Practice. Ed. by Clarence E. Sims. pp. 225–227. 1962 (no month).*

* cited by examiner

*Primary Examiner*—Roy King
*Assistant Examiner*—Andrew Wessman
(74) *Attorney, Agent, or Firm*—Weatherly & Associates, LLC; Mitchell G. Weatherly

(57) ABSTRACT

A method and an apparatus for advantageously introducing a flame and a high velocity oxidizing gas into a furnace for metal melting, refining and processing, particularly steel making in an electric arc furnace. The steel making process of an electric arc furnace is made more efficient by shortening the time of the scrap melting phase and introducing an effective high velocity oxidizing gas stream into the process sooner to decarburize the melted metal. In one implementation of an apparatus, improved efficiency is obtained by mounting a fixed burner/lance closer to the hot face of the furnace refractory at an effective injection angle. This mounting technique shortens the distance that the flame of the burner has to melt through the scrap to clear a path to the molten metal and shortens the distance the high velocity oxygen from the lance travels to the slag-metal interface thereby increasing its penetrating power. The method additionally includes supplying a plurality of reaction zones with the high velocity oxidizing gas to decarburize the melted metal. The plurality of reaction zones increases the surface area available for the reaction thereby allowing a more rapid rate of decarburization and a more homogenous metal bath. The reaction zones are supplied with the high velocity oxidizing gas according to an oxygen supply profile which is related to the carbon content of the metal bath. In this manner an optimal amount of oxygen can be introduced into the metal bath to shorten the decarburization process without producing excessive oxidation of the metal bath and excessive free oxygen in the furnace.

34 Claims, 7 Drawing Sheets

METHOD FOR MELTING AND DECARBURIZATION OF IRON CARBON MELTS

RELATED APPLICATIONS

This application is a continuation in part of application U.S. Ser. No. 09/502,064 filed Feb. 10, 2000 by Shver, now U.S. Pat. No. 6,289,035. The disclosure of U.S. Ser. No: 09/502,064 is hereby incorporated by reference herein.

BACKGROUND OF THE INVENTION

1. Field of the Invention

The present invention generally relates to a method and apparatus used in metal melting, refining and processing, for example, steel making in an electric arc furnace (EAF), and more particularly, to a method and apparatus for the melting and decarburization of an iron carbon melt.

2. Description of Background Art

An electric arc furnaces (EAFs) make steel by using an electric arc to melt one or more charges of scrap metal which is placed within the furnace. Modem EAFs also make steel by melting DRI (direct reduced iron) combined with the hot metal from a blast furnace. In addition to the electrical energy of the arc, chemical energy is provided by auxiliary burners using fuel and an oxidizing gas to produce combustion products with a high heat content to assist the arc.

If the EAF is used a scrap melter, the scrap burden is charged by dumping it into the furnace through the roof opening from buckets which also may include charged carbon and slag forming materials. A similar charging method using a ladle for the hot metal from a blast furnace may be used, along with injection of the DRI by a lance, may be used to produce the burden.

In the melting phase, the electric arc and burners melt the burden into a molten pool of metal, called an iron carbon melt, which accumulates at the bottom or hearth of the furnace. Typically, after a flat bath has been formed by melting of all the burden introduced, the electric arc furnace enters a refining and/or decarburization phase. In this phase, the metal continues to be heated by the arc until the slag forming materials combine with impurities in the iron carbon melt and rise to the surface as slag. When the iron carbon melt reaches a boiling temperature, the charged carbon in the melt combines with any oxygen present in the bath to form carbon monoxide bubbles which rise to the surface of the bath. Generally, at this time high velocity, usually supersonic, flows of oxygen are blown into the bath with either lances or burner/lances to produce a decarburization of the bath by the oxidation of the carbon contained in the bath.

By boiling the bath with the injected oxygen, the carbon content of the bath can be reduced to a selected level. If an iron carbon melt is under 2% carbon it becomes steel. EAF steel making processes typically begin with burdens having less than 1% carbon. The carbon in the steel bath is continually reduced until it reaches the content desired for producing a specific grade of steel, down to less than 0.1% for low carbon steels.

With the imperative to decrease steel production times in electric arc furnaces, it becomes necessary to deliver effective decarburizing oxygen to the iron carbon melt as early in the steel making process as possible. Conventional burners mounted on the water cooled side walls of the furnace generally must wait until the melting phase of the process is substantially complete before starting high velocity injection of oxygen for the decarburization process. These burners can not deliver effective high velocity oxygen before then because unmelted scrap is in the way of the injection path and would deflect the oxygen flow. Additionally, the bottom of the electric arc furnace is spherical shaped and the melted scrap forms the melt in the middle of the furnace first and then rises filling up the sides. Early in the melting phase a high velocity oxygen stream has no effective way to reach the iron carbon melt surface to penetrate it and decarburize the melt.

Therefore, it would be highly advantageous to reduce the melting phase of an electric arc furnace so that high velocity oxygen could be injected sooner and decarburize the melt faster.

One way to shorten the melting phase is to add substantially more energy with the burners at early times in the melting phase to melt the scrap faster. There are, however, practical considerations with conventional side wall mounted burners that limit the amount of energy which can be introduced into the furnace and the rate at which it can be used efficiently. When scrap is initially loaded into the furnace, it is very near the flame face of the burner and the danger of a flash back of the flame against the side wall where it is mounted is significant. The panels where the burners are mounted are typically water cooled and a burn through of a water carrying element in an electric arc furnace is a safety concern. To alleviate this concern, many fixed burners are run at less than rated capacity until the scrap is melted some distance away from the face of the burner. Only after the burner face has been cleared does the burner operate to deliver its maximum energy. Another problem to increasing the energy added during the early part of the melting phase is that the flame of the burner is initially directed to a small localized area of the scrap on the outside of the scrap burden. It is difficult to transfer large amounts of energy of the burner from this localized impingement to the rest of the scrap efficiently. Until the burner has melted the scrap away from its face and has opened a larger heat transfer area, increasing a burner to maximum output would only result in a substantial portion of the energy in the combustion gases heating the atmosphere.

Therefore, it would be advantageous to be able to increase the amount of energy applied by a burner during the early part of the melting phase which did not produce a risk of flash back for the water cooled panels of the upper shell of the furnace.

It would also be advantageous to use this increased amount of energy more efficiently and to transfer increased portions of the energy to the scrap burden.

Conventionally, oxygen is blown or injected into the iron carbon melt where it reacts with the carbon in the molten bath to lower the carbon content to the level desired for the end product. In general, the rate of decarburization in an electric arc furnace is determined by the carbon concentration of the iron carbon melt, the oxygen injection rate and the surface area of the reactions sites. At higher bath carbon concentrations, the reaction rate is not significantly limited by the availability of carbon to enter the reaction. However, as the bath carbon decreases to concentrations under approximately 0.15%–0.20% of carbon, it becomes increasingly difficult to achieve an acceptable rate. This is because the carbon concentration of the bath becomes the decarburization rate determining factor. The decarburization rate, after the critical carbon content has been reached, is dominated by mass transfer of the carbon and the carbon concentration.

The prior art practice to decarburize an iron carbon melt is characterized by the localized application of a large volume of oxygen by means of devices such as lances and burner/lances. Due to the localized nature of this process, the decarburization rate depends on the rate of oxygen injection to the bath, the carbon concentration and the mass transfer of carbon to the reaction area. At lower carbon levels, the iron oxide concentration in the slag reaches levels greater than equilibrium would allow, due to depleted local carbon concentration and poor mass transport. This causes greater refractory erosion, loss of iron yield, increased requirements for alloys, and a low efficiency of oxygen utilization.

Therefore, it would be advantageous to provide a method and apparatus to supply oxygen for efficient decarburization of the iron carbon melt at all carbon concentrations. A method that increased the number of reaction zones and supplied significantly more effective oxygen early in the process would be advantageous because it would shorten the duration of decarburization. Particularly important is the efficiency of the oxygen supply after the iron carbon melt reaches a low carbon content in order to maximize the decarburization rate, without over oxidizing the slag and producing excess amounts of FeO. This would reduce operating costs by improving oxygen efficiency, reducing excess iron oxidation, improving alloy recovery, and increasing productivity.

The conventional oxygen injection equipment that has been used for decarburization is not generally suited for efficient introduction of oxygen into an iron carbon melt. The use of retractable consumable or water cooled lances through the slag door opening, or through the side wall, is always limited by the space available to position the equipment around the furnace. Its location is usually only practical in the quadrant of the furnace shell near the slag door. The basic furnace design, required manipulator movement, the size of the manipulator and the necessity of operators to observe the use as well as to allow easy access dictates the location of the manipulator. The design is also responsible for the introduction of a substantial amount of cold ambient air into the process through the slag door or side wall opening during manipulation of the moveable lance. These large amounts of cold air reduce the efficiency of the process and also contribute to a nitrous oxide increase in the furnace atmosphere. There is also a significant delay in moving the lance into the furnace through the scrap burden. The scrap must be melted in front of the lance before it can advanced into the hot reaction zone of the furnace where it can deliver effective oxygen.

Fixed oxygen injection equipment such as a burner/lance mounted on the side wall water cooled panels, or upper shells of the furnace are positioned a significant distance away from the iron carbon melt. That distance is generally determined by the geometry of the furnace side wall with respect to the transition from the upper shell to the lower shell of the furnace which forms a step. The water cooled part of the upper shell where the burner/lances have been located is mounted on the lower shell or refractory, but typically about 15–24" back from the hot face of the refractory. Because a fixed burner/lance has had to fire over this step, the traditional fixed wall oxygen injection equipment had to be located about 45" above the molten bath in an attempt to deliver oxygen with the optimum angle of impingement. This distance and the angle requires the length of the injected stream of oxygen to be about 65" or longer.

It is very difficult to deliver 100% of an oxygen stream effectively to a reaction zone at these distances. The amount of effective delivery of a high velocity (high kinetic energy) oxygen stream to the iron carbon melt is proportional to the diameter of the oxygen injector opening (in the case of a converging-diverging nozzle the bore size of the nozzle) and the length the oxygen jet travels to the iron carbon melt. Thus, increasing the bore size increases the total amount of effective oxygen reaching the iron carbon melt, but may also result in an increase of unused oxygen in the furnace atmosphere. Another method of enhancing the effectiveness of an oxygen stream for decarburization has been to shroud it with the products of combustion, or other gases. The shrouding tends to maintains the stream together over a longer distance thereby increasing its penetrating power. In spite of the effectiveness gained by shrouding, a significant amount of the oxygen is lost to the furnace environment causing several detrimental effects on operations. Initially, there is the increased cost of the shrouding gases and specialized equipment to form the shroud. The excess oxygen causes damage to the side wall panels, erosion of the shell refractory, development of excessive iron oxide in the slag, excessive electrode oxidation, reduction in the delta life, and may cause over heating of the furnace evacuation system.

Moreover, conventional oxygen injection equipment that has been used for decarburization is not generally suited to varying the oxygen supply rate over substantial ranges. Fixed oxygen injection equipment such as burner/lances mounted on the side wall panels of the furnace have the problem that they are positioned some distance away from the surface of the iron carbon melt. These fixed lances obtain their oxygen injection capability by a supersonic or high velocity nozzle which accelerates the oxygen such that its kinetic energy is enough to penetrate the surface of the iron carbon melt even from considerable distances. If the flow rates of these injectors are reduced significantly, the high velocity nozzles will not impart enough gas velocity to the oxygen to penetrate and create an efficient reaction zone for decarburization.

SUMMARY OF THE INVENTION

The invention provides a method and apparatus for improving the melting and decarburizing phases of an iron carbon melt. More particularly, the method and apparatus are useful for the steel making operation of an electric arc furnace.

According to one embodiment of the invention for steel making, the duration of the melting phase is decreased by adding increased amounts of energy early in the melting phase with the combustion products of a burner/lance flame which is directed into a more efficient combustion reaction zone, preferably below the refractory line of the furnace. When the burner flame is generated at this position of the furnace, several distinct advantages pertain to the steel making process. Melting a path for an injection of high velocity oxygen is facilitated because there is less path length to clear and it can be done faster. The time for melting the path length is further reduced by increasing the burner output to its maximum rating early in the melting phase. With a positioning of the flame below the refractory line, there is substantially less possibility for a flash back and the refractory can withstand such operation without catastrophic failure. The process of melting a clear path is also faster because the flame works in a hotter area closer to the electric arc. Further, the hot combustion gases flow upward through the total burden of scrap and cause additional energy transfer instead of heating the furnace atmosphere.

In addition to the efficiency gain caused by starting the oxidizing gas early in the melting cycle, a method for decarburization includes a process for increasing the efficiency of the oxidizing gas utilization in the iron carbon melt. More particularly, the method includes supplying a plurality of reaction zones with an oxidizing gas to decarburize an iron carbon melt with an efficient oxygen supply profile which is related to the carbon content of the melt. The multiple reaction zones are used to increase the amount of oxygen which can be effectively used for decarburization of the melt by increasing the reaction zone area and by making each reaction zone more efficient. Each reaction zone is more efficient because the surface dynamics of the process are occurring in multiple localized areas. The carbon being depleted in each local area is replenished more quickly than a single large area because of the better mass transport. This will lower the duration the decarburization process and at the same time oxidize less iron.

Preferably, after the critical carbon content has been reached, or optionally a carbon content near to the critical content below 0.2%, the multiple reaction zones can be supplied with reduced amounts of oxygen which are dependent upon the amount of carbon content at the particular time of the process. Preferably, the total oxygen supply profile for the multiple zones can approximate an exponential decay, similar to the demand for oxygen by the decreasing carbon content. Using multiple reaction zones during this phase of the decarburization process several distinct advantages. Because this phase of the decarburization process is dependent upon the surface reaction kinetics and carbon content, as the carbon content decreases, the multiple localized areas become even more efficient compared to a single reaction area. The increase in efficiency is greater because of the increased total reaction area and decreased time for the mass transport of the carbon in each zone. Further, multiple reaction zones combined with the shorter distance for the oxygen to travel to the molten metal in each zone creates several areas of deep penetration of the melt to increase agitation which is beneficial to the reaction.

A preferred embodiment of the invention includes a plurality of injection apparatus which efficiently supply high velocity combustion gases and oxidizing gas to each reaction zone. The injection apparatus preferably comprise fixed burner/lances or lances which are capable of injecting combustion gases and high velocity oxygen, preferably at supersonic velocities. In the illustrated embodiment, the high velocity oxygen is developed by a nozzle structure of a burner/lance which accelerates the oxidizing gas to supersonic velocities. The nozzle structure of the burner/lance also includes fuel and secondary oxidizing gas jets which are used after combustion to form a shroud around the high velocity oxygen and maintain its penetrating power.

The burner/lance or lance is then mounted in a protective enclosure which allows the nozzle structure to be located closer to the surface of the melt and closer to the center of the furnace than other fixed burners mounted on the side wall panels. The protective enclosure in the preferred embodiment is a fluid cooled enclosure having at least one face adapted to withstand the harsh environment of the inside of the furnace. The burner lance is mounted at an optimal attack angle through a mounting aperture in this face.

Mounting the burner lance in a protective enclosure produces several advantages. The protective enclosure moves the burner flames and high velocity oxygen flow away from the wall of the furnace and closer to the edge of the refractory. This greatly reduces or eliminates the chance that the burner flames or the high velocity oxygen flow will reflect (flashback) against the furnace wall and create damage. Advantageously for the high velocity oxidizing gas flow, the flow has a shorter distance to travel to reach the melt compared to a lance mounted on the side wall. The shorter flow path length permits the oxidizing gas flow to impinge on the melt with a higher velocity and more concentrated flow pattern which causes a more efficient and rapid decarburization. The shorter flow path length also eliminates the need for excessive shrouding gasses and oxygen jets with large flow rates. This significantly reduces the negative oxidizing effects to the furnace because of excess oxygen.

Further, the shorter flow path length provided by the enclosure and multiple zones permitting reduced flow rates at each zone, allows the flow of the oxidizing gas at each zone to be controlled over a substantial range while still maintaining high velocity and efficient penetrating power for the melt at each zone. The capability of the preferred apparatus to permit the control of the oxidizing gas flow rate over a substantial range while still maintaining efficient decarburizing velocity facilitates the supply of an oxidizing gas profile to each reaction zone which is related to the carbon content of the melt.

These and other objects, aspects and features of the invention will be more clearly understood and better described when the following detailed description is read in conjunction with the attached drawings, wherein similar elements throughout the views have the same reference numerals, and wherein:

DETAILED DESCRIPTION OF A PREFERRED EMBODIMENT

Figure 1:
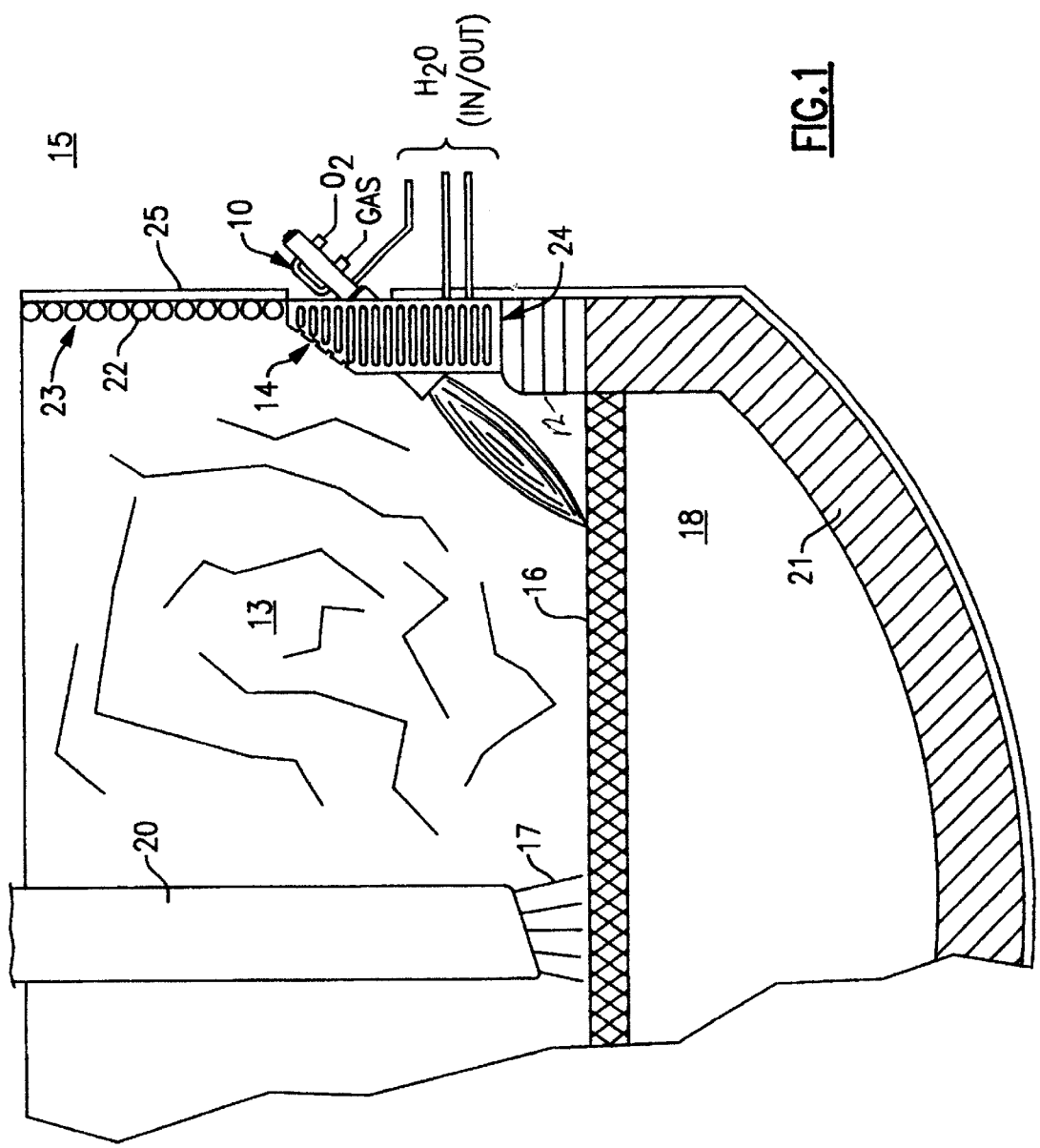
FIG. 1 is a partially cross-sectioned side view of an improved burner/lance configuration for an electric arc furnace capable of more efficient operation for melting and decarburization of an iron carbon melt in accordance with the invention.
Figure 2:
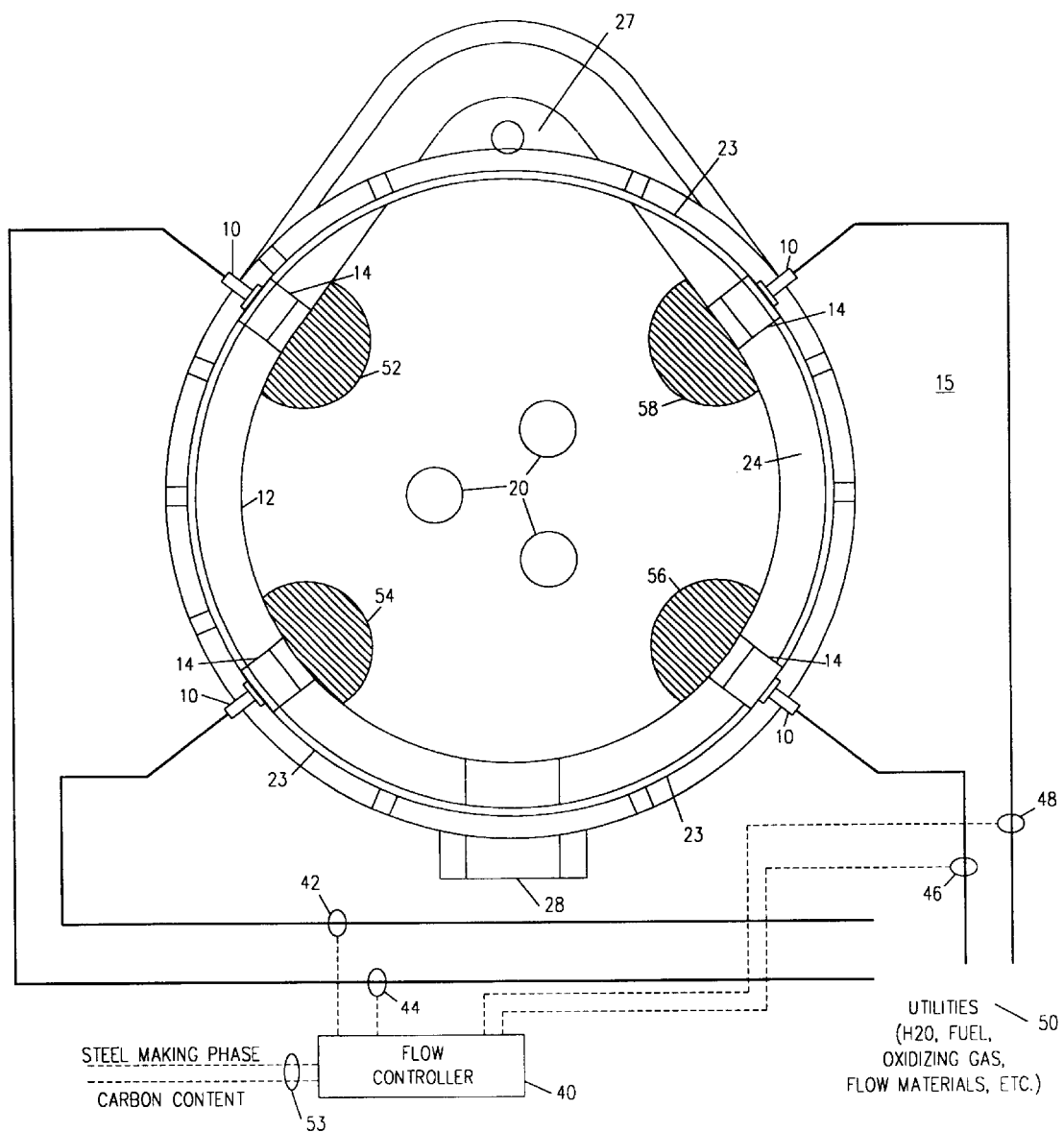
FIG. 2 is a partially cross-sectioned plan view of the burner/lance configuration for the electric arc furnace illustrated in FIG. 1 illustrating a plurality of the burner/lances and a controller for regulation of their operation.

Referring to FIGS. 1 and 2, a plurality of burner/lances 10 are adapted to operate in several different modes to provide auxiliary heating, metal refining and other metallurgical processing capabilities in an electric arc furnace (EAF) 15, or similar furnace for metal melting, refining and processing. Preferably, the burner/lances 10 can be those described previously in the Shver, Shver, et al. I or II references, but they could also be other commercially available air fuel burners, oxygen fuel burners, or oxygen, air fuel burners. Also, while the preferred embodiments of the invention will be described using and mounting such burner/lances, it will be evident that other similar apparatus, such as fixed lances or the like, can be used with the invention to produce advantageous results.

The invention will be useful for any metal melting, refining or processing apparatus having a discharge opening whose efficiency can be increased by placing the discharge opening closer to the surface of the molten metal or closer to the center of the furnace. Particularly, the invention will be advantageous for those apparatus, such as burner/lances and lances, which have a lancing capability with a high velocity oxidizing gas, such as supersonic oxygen.

In FIG. 1 which shows a side view, the EAF 15 melts ferrous scrap 13, or other iron based materials, by means of an electric arc 17 produced from one or more electrodes 20 to collect a molten metal bath or melt 18 at its hearth 21. The burner portions of the burner/lances 10 assist in the scrap melting process by introducing high temperature flames and combustion products which transfer heat to the scrap. The generally spherical shaped hearth 21 is made of refractory material to withstand the high temperature of the molten metal. As best seen in FIG. 2, the hearth 21 of the EAF 15 is surrounded by an upper shell 19 which is comprised of a series of arcuate fluid cooled panels 23. It is known that the fluid cooled panels 23 forming the side wall of the furnace 15 can be of several conventional types, such as those in the illustrated embodiment with an outer shell member 25 and a plurality of parallel cooling coils 22, an open arrangement of cooling coils with support columns (not shown), or several spray bar arrangements where an inner plate is sprayed with cooling fluid (not shown). The melt 18 consisting of iron and carbon is generally covered with various amounts of slag 16 which is produced by chemical reactions between and the melt and slag forming materials added to the furnace before or during the melting process of the metal.

Once the scrap metal or other burden has been melted, the metal bath 18 is generally refined or decarburized by oxygen lancing. This reduces the carbon content of the metal to the grade of steel desired. During refining and thereafter, the metal bath 18 is typically heated by the electric arc 17 above its melting temperature. This superheating allows the melt to boil and continue the carbon oxidation with the lanced oxygen. The superheating is also used to allow the metal bath 18 to remain fluid while being transported in a ladle or other carrier to another process step.

The burner/lances 10 are preferably mounted through an opening in the fluid cooling coils 22 of a side wall panel 23 of the furnace 15 into generally rectangular shaped mounting blocks or enclosures 14. In the illustrated embodiment, the mounting enclosure 14 preferably rests on the step 24 formed between the panels 23 of the side wall of the upper shell of the furnace 15 and the refractory of the hearth 21, but could also be supported or suspended from another suitable structural member of the furnace 15. The mounting enclosure 14 is shown located on the inside of the cooling coils 22 of the type of side wall panel 23 having an outer shell member 25. Similarly, such mounting enclosure could be located on the inside of the cooling coils of an open coil type of side wall panel or the inside of a spray bar type side wall panel. When retrofitting an existing furnace with the mounting enclosure 14, this configuration would be preferred because little change to the furnace structure would be needed. For new furnaces, or for newly manufactured replacement shells or panels, the mounting enclosure 14 could also be integrated into the side wall panel 23 by removing the area of cooling coils 22 or the area of the spray cooled shell providing the opening for the mounting enclosure 14.

The burner/lance 10 is received in a mounting aperture of the mounting enclosure 14 so that its discharge opening or face is extended beyond the hot edge 12 of the refractory hearth 21. This allows the flow of materials from the discharge opening of the burner/lance 10 to miss the edge of the step so as to not degrade the refractory, particularly with a high velocity oxidizing gas. The mounting of the discharge opening of the burner/lance 10 over the step also brings the material flows from the burner 10 close to the surface of the melt 18 and close to the center of the furnace 15 thereby making the process operation more efficient. The mounting enclosure 14 also provides protection for the burner/lance 10 from the intense heat of the furnace 15 and mechanical damage from falling scrap 13.

The burner/lance, or other apparatus, 10 are typically slanted downward at a mounting angle in the mounting aperture 26, preferably between 30–60 degrees, to direct a material flow 29 from the burner/lance 10 comprised of combustion products, and/or other flows of injected materials, toward the metal melt 18 in the hearth 21 of the furnace. In addition to its downward inclination, the burner/lance, or other apparatus, 10 may also optionally be directed from a radial direction (center of the furnace), preferably from 0–10 degrees. To cause suitable penetration of the metal bath 18 without splashing, a supersonic flow of oxidizing gas, preferably oxygen, should impinge at an angle which is neither too shallow nor too steep. If the angle is too steep, excessive steel and slag splashing may occur. If the angle is too shallow, then the flow may not sufficiently penetrate the surface of the melt 18. Preferably, an angle of approximately 45 degrees (+9 degrees or −9 degrees) has been found to be efficacious in producing desirable results from lancing with a high velocity oxidizing gas.

Depending upon the configuration of the furnace 15, as seen in FIG. 2 in plan view, the burner/lances 10 may be mounted anywhere along on the side wall 12 of the upper shell. Individual burners/lances or burners (not shown) may also be mounted in the sump 27 of the furnace 15, if it is an eccentric bottom tapping furnace, or above or in its slag door 28. Generally, a modem furnace 15 has more than one burner/lance, or other apparatus, 10 mounted around its periphery; the number depending upon its size, configuration, melting power and operation.

Generally, such burner/lances 10 are strategically located along the side wall 12 for a number of different purposes, for example, at the cold spots in the furnace to assist with the melting of the scrap. These cold spots are different for DC (Direct Current) furnaces and AC (Alternating Current)

furnaces, and may be different even between these types of furnaces depending on size, manufacturer, and the operating procedure of the furnace. Positioning may also depend on other factors such as the materials which are introduced into the furnace by the burner/lance, or other apparatus, 10 and the purpose and timing of its introduction. Other materials which can be introduced include metallurgical and alloying agents, slag forming and foaming agents, oxidizing gases for refining, melting, decarburization, post combustion, etc. The mounting enclosure 14 can be positioned and advantageously mount an apparatus 10 wherever it needs to be on the side wall of the furnace 15.

In the preferred embodiment, there are four burner/lances 10 with enclosures 14 which are equally spaced around the periphery of the furnace 15. The configuration, according to the invention, is used to provide a uniform distribution of the reaction zones 52, 54, 56 and 58 for decarburization. The reaction zones 52, 54, 56 and 58 are the areas where the high velocity oxidizing gas penetrates the slag and iron carbon melt and the oxidizing reaction, termed decarburization, between the lancing gas and the bath carbon occurs. By providing a plurality of reaction zones, the invention not only produces a more uniform distribution of the oxidizing gas but also more area in which the reaction can occur. This allows increased amounts of oxidizing gas to be used which are effective, i.e., the increased oxidizing gas contributes to reducing the decarburization time, not to over oxidizing the iron carbon melt or producing free oxygen in the furnace atmosphere.

Whatever the other functions or modes the burner/lances 10, or other apparatus, 10 may have, it is important when an oxidizing gas lancing mode is provided, that the apparatus be closer to the surface of the melt and be directed more to the center of the furnace. Further, when a multimode apparatus 10 has a burner mode which assists in melting scrap and/or clearing a pathway through the scrap for the lancing mode, it is important that the apparatus be closer to the surface of the melt and be directed more to the center of the furnace. The mounting enclosure 14 provides an extension for mounting the apparatus 10 beyond the water cooled panels 23 of the furnace 15 to allow its discharge opening to reach beyond the step 24 of the refractory of the hearth 21 and be closer to the center of the furnace.

In the illustrated embodiment of FIG. 2, the burner/lances 10 are preferably conventional multimode apparatus which have a burner function and a lancing function. One apparatus which provides for the injection of thermal energy to assist in the melting phase of the steel making process and for the injection of high velocity oxidizing gas to decarburize the iron carbon melt. The burner function of the burner/lances 10 is provided by mixing an oxidizing gas, preferably oxygen, and fuel, preferably natural gas, which produces a flame comprised of combustion gases having a high heat content. The thermal energy of the combustion gases may be transferred to the scrap metal which is melted in the furnace through radiation and convection, or a combination of these, as is known. To control the burner function, a flow controller 40 is used to control the flows of oxidizing gas and fuel to the burner/lances 10 by means of flow control actuators and sensors 42, 44, 46, and 48 located in the supply paths between the apparatus 10 and utilities 50. The flow controller 40 preferably is a programmable device which has a program for independently controlling the burner function for each burner/lance 10 as to at least its oxidizing gas/fuel ratio and its thermal power output.

Preferably, the flow controller 40 additionally controls the lancing function through its program as to the amount of high velocity oxygen and its timing. Optionally, the flow controller 40 has as part of its program control of a flame for shrouding the high velocity oxidizing gas to increase its effective penetrating power of the iron carbon melt. The flow controller 40 also receives inputs 53, either manually, from sensors, from another programmed control—for example a controller regulating the electrical energy of the arc, or from an internal timer indicating the phase of the steel making process and carbon content of the iron carbon melt. The flow controller 40 uses these physical parameters of the furnace 15 to determine by its program when the modes of the burner function should be changed, when the burner function should be changed to the lancing function, and how the lancing function should be varied.

Figure 3:
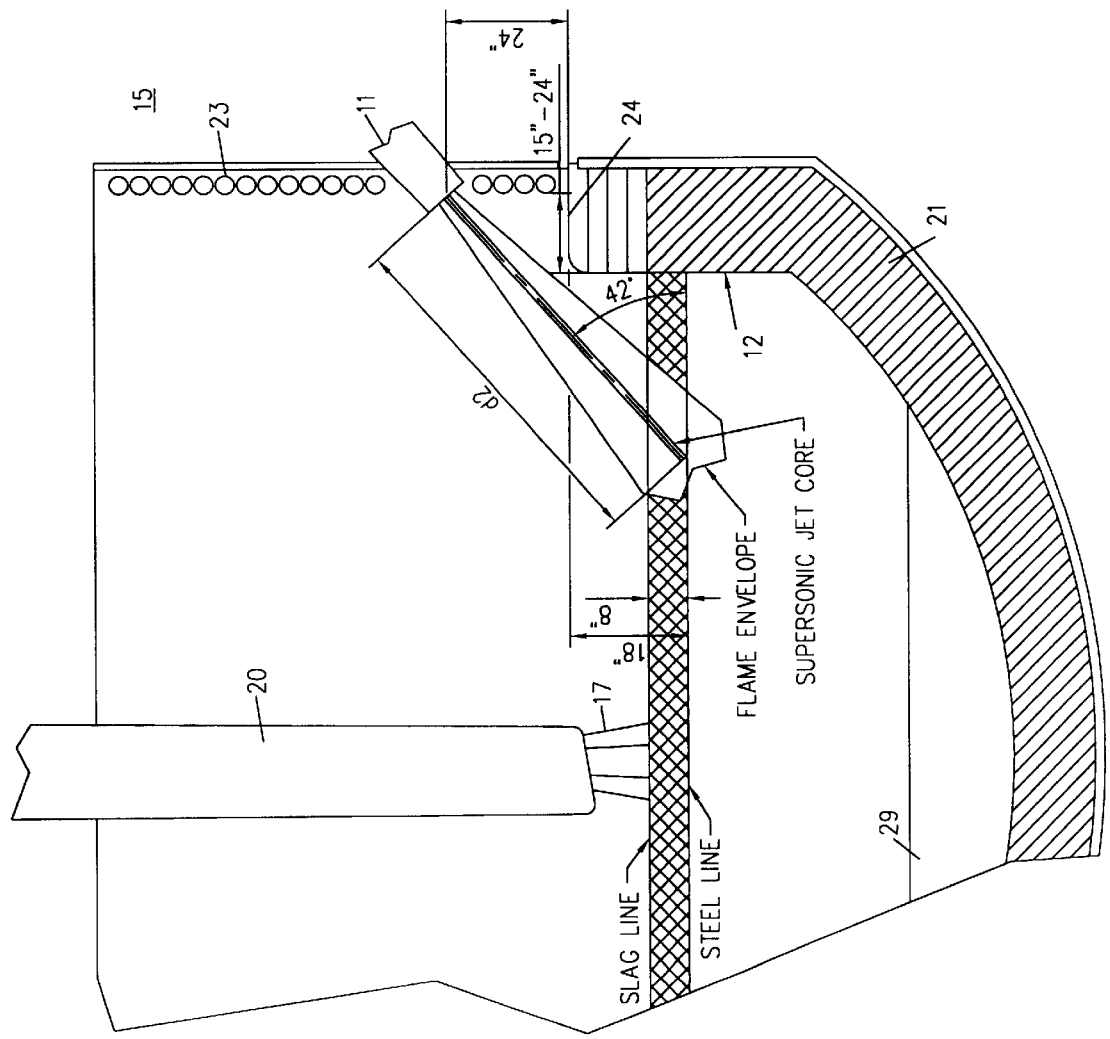
FIG. 3 is a partially cross-sectioned side view of a conventional burner/lance configuration for an electric arc furnace capable illustrating a side wall mounting.
Figure 5:
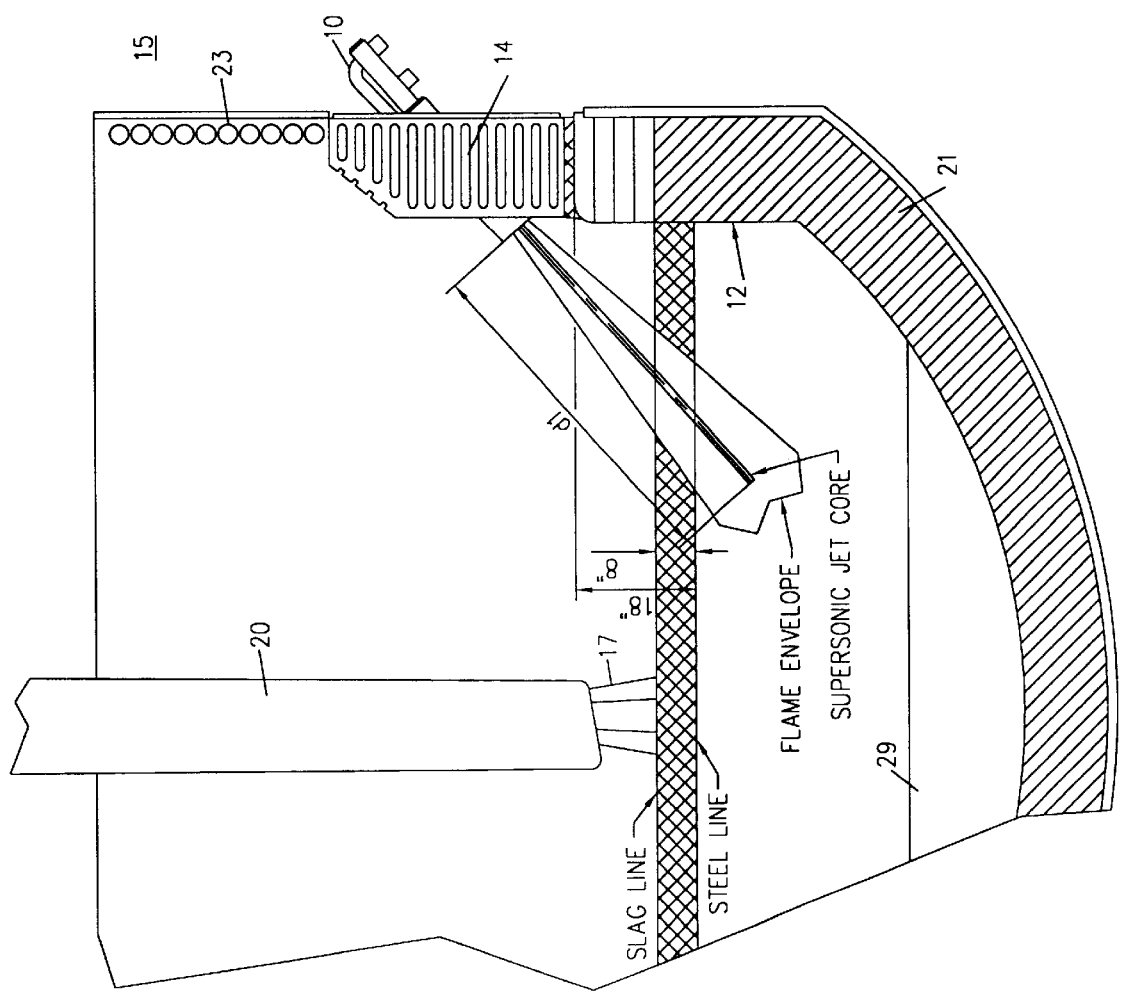
FIG. 5 is a more detailed side view of the burner/lance configuration for an electric arc furnace illustrated in FIG. 1 showing effective oxidizing gas lancing in a fully melted phase of steel making.
Figure 6:
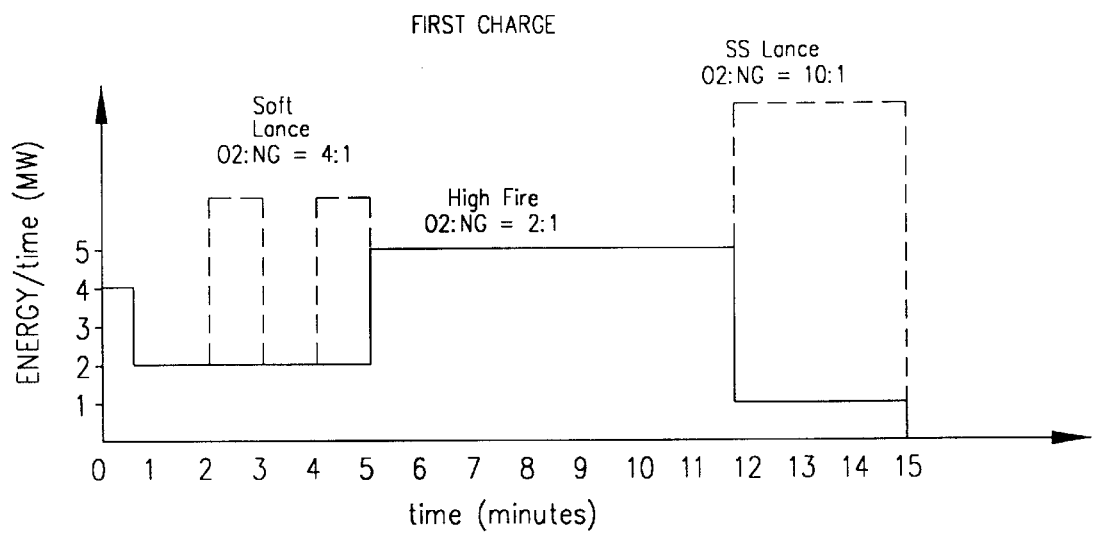
FIG. 6 is a graphical representation of the chemical energy as a function of time input by a burner/lance during the first charge of the melting phase for the steel making process of the conventional burner/lance configuration illustrated in FIG. 3.

To more distinctly show the advantages of the invention, a comparison between the operation of the conventional burner/lance 11 mounted on the side wall of the furnace 15, as illustrated in FIG. 3, and the operation of the same burner/lance 10 mounted in the water cooled enclosure 14, in accordance with the invention, as illustrated in FIGS. 5 and 6, will now be made. The conventional mounting configuration of the burner/lance 11 in FIG. 3 has the apparatus mounted in the water cooled side wall panel 23 at an injection angle of 42 degrees or less. The burner/lance 11 is typically located at least 24" above the step 24 and about 15–24" away from the hot face 12 of the refractory 21 (depending upon the width of the refractory) so that the burner/lance flame and oxidizing gas flow clear the step. The burner/lance 11 is assumed to have a lancing capability with a high velocity oxidizing gas from a supersonic nozzle. The assumed effective distance of a supersonic jet core from the nozzle with a flame shrouding is about d2. A typical furnace 15 is shown where the fully melted steel line comes to about 18" down from the sill line or step 24. The slag line is typically about 8" up from the steel line without foaming.

With the present capability and configuration for lancing, the burner/lance 11 must wait until the steel line advances from the bottom of the furnace, or from a hot heel 29, to almost fully melted during one or several melting stages. Unless the slag and steel lines can be penetrated by the supersonic jet core, the oxidizing gas lancing will not be effective and will only contribute to over oxidation of the iron carbon melt and free oxygen in the furnace atmosphere, both being detrimental to the operation of an efficient steel making process. In addition, because there is scrap in the way of the oxidizing gas lancing, it must be cleared before such lancing can occur. The burner function of the burner/lance 11 must clear the face or discharge end of the apparatus by melting scrap from the side wall 23 to the melt surface before effective lancing can begin. Because the scrap generally falls inward from the side wall 23, a substantial amount of the heat from the combustion gases tend to bounce off the outside of the heap as it collapses and only serve to increase the temperature of the furnace atmosphere. In addition, until the burner/lance 11 melts a pocket in the scrap, the flame of the apparatus is prone to flash back directly into the water cooled panel 23, possibly with serious consequences.

Figure 4:
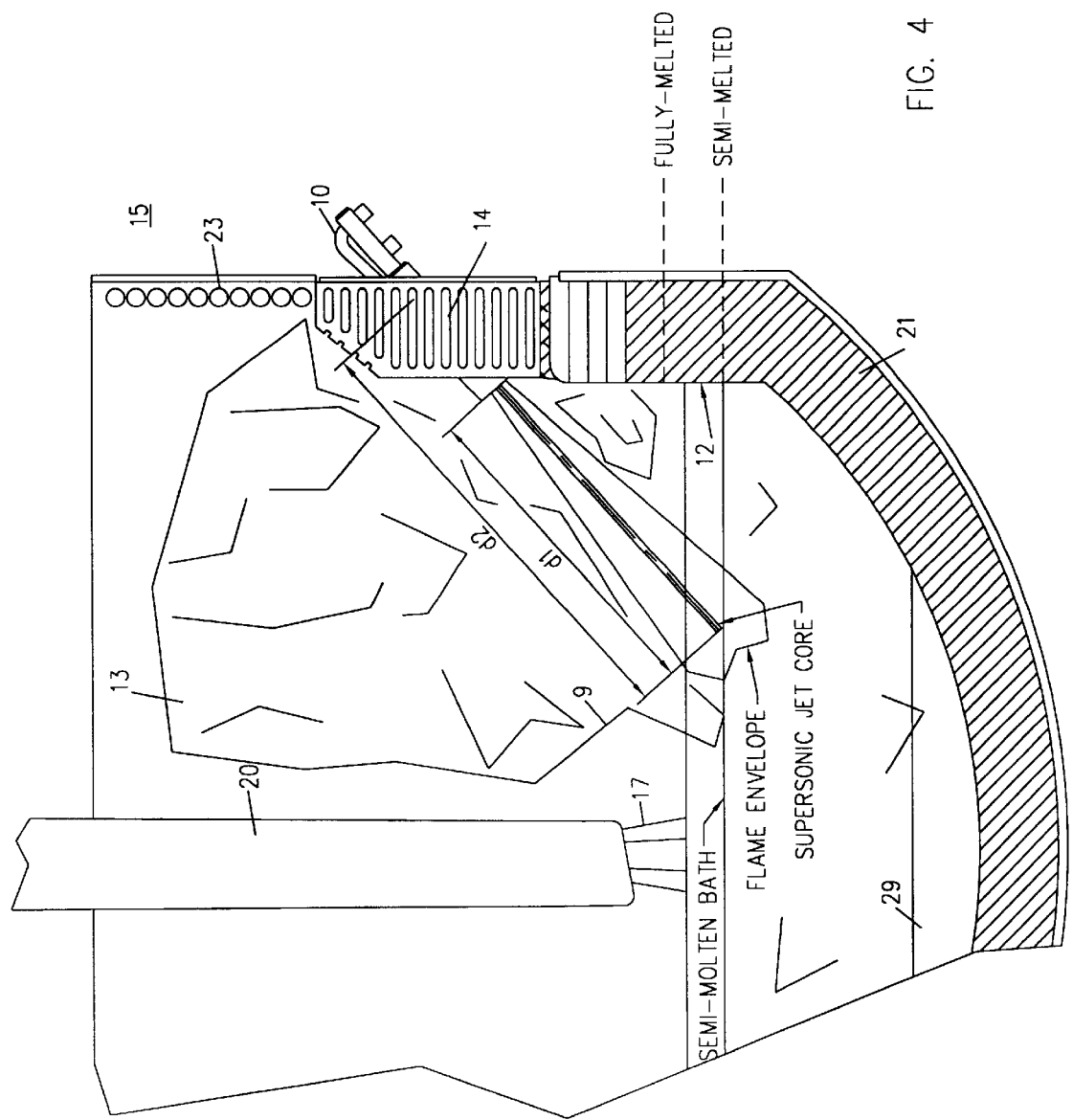
FIG. 4 is a more detailed side view of the burner/lance configuration for an electric arc furnace illustrated in FIG. 1 showing effective oxidizing gas lancing in a semi-melted phase of steel making.

In contrast, the configuration for the burner/lance 10 and enclosure 14 in FIGS. 4 and 5 illustrate that effective lancing with the oxidizing gas can be made much earlier in the melting cycle. FIG. 4 shows the burner/lance configuration with the melting phase in a semi-melted state while FIG. 5 shows the configuration with the melting phase in a fully melted state. The discharge end of the burner/lance 11 has been advanced to the edge of the hot face 12 of the refractory by protecting the apparatus with the enclosure 14. This moves the face or discharge end of the burner lance down (toward the melt) by the distance that the side wall burner has to be elevated to fire over the step and in (toward the center of the furnace) by the width of the step. This produces several advantages in operation over the configuration of FIG. 3. For the burner function, there is a much shorter distance to clear a path through the scrap (d1 as opposed to d2) to the surface of the melt so that this task can occur faster. In addition, the burner flame with this positioning can not flash back into the water cooled panel 23 and, if some flash back occurs, it will be absorbed by the refractory 21 which will not fail under such operation. Therefore, the burner function of the burner/lance 10 may be turned to its maximum rating much earlier than the burner/lance 11 shown in FIG. 3. The thermal energy from the burner/lance is used more efficiently than before because, instead of bouncing off the outside of the scrap burden 13, the hot gases permeate up through it thereby transferring more energy to the scrap.

With respect to the lancing function of the burner/lance 11, the distance that the flow of oxidizing gas must travel from the discharge end of the apparatus to the slag and melt surface has also been reduced by an amount proportional to the distance it was move down and in. This alone produces a significant increase in decarburization efficiency. In FIG. 4, once a path has been cleared, it is shown that this allows the oxidizing gas to reach a semi-molten steel level with effective lancing power much earlier in the melting cycle than the conventional configuration, even with the same effective lancing capability of the burner/lances. This permits effective decarburization to begin earlier in the melting cycle so that it may be completed earlier and reduce overall process time. Further, as seen in FIG. 5, after the start of effective lancing the scrap continues to melt and the steel line rises to the fully melted stage. From the semi-melted stage to the fully melted stage and thereafter, the lancing effectiveness is greater for the burner/lance 10. The supersonic jet core penetrates deeper into the iron carbon melt because of the reduced path distance to the melt provided by this configuration.

While the preferred configuration of the burner/lance 10 mounts the flame discharge end as close to the hot face 12 of the refractory 21 and sill line 24 as possible to maximize the advantages of the invention, it is evident that any movement of the discharge end in those directions would be beneficial. The advantages accrue nonlinearly with the most increase in effectiveness occurring nearer to the sill line and hot face of the refractory but there is still a measurable benefit from as small as a 20% movement toward the sill line or toward the hot face of the refractory. In other words, the benefits of the invention are obtained from the sill line to 80% of the vertical distance between the sill line and a conventional mounting on the side wall and from the hot face to 80% of the horizontal distance between the hot face and a conventional mounting on the side wall.

To more clearly illustrate the manner in which the invention improves the steel making process, a melting phase and decarburizing phase for steel making will now be described. In FIG. 6 multiple modes are scheduled for the burner/lance 11 mounted on the side wall of an electric arc furnace 15 during at least one portion of the melting process of the furnace, in the example, the first of several scrap buckets (first charge). This portion of the melting process is scheduled for approximately 15 min. The burner/lance 11 illustrated is rated for maximum output at 5 MW. Initially, the burner/lance 11 is operated at a firing rate of 4 MW. to make sure it is not clogged during the loading of the scrap. As soon as the electric arc is turned on for the furnace 15, signaling that the roof is closed and scrap loading is completed, the burner is turned down to 2 MW. for the first 5 min. of the this portion of the melting cycle. This is to allow the burner/lance 11 to make a pocket in the scrap so that the flame may spread out and not flash back on the water cooled panel 23. During this time for some part of the interval, for example at the start of mins. 2 and 4, for approximately 15–30 sec., the oxygen/fuel ratio is turned up from stochiometric (2:1) to a higher oxygenated ratio of (4:1). This operation, sometimes termed soft lancing because the burner/lance uses subsonic oxygen, allows the scrap to be burned by the excess oxygen so that the pocket can be established more readily, clearing the face of the burner/lance 11. Because this soft lancing is directed to impinge on the scrap and does not reach the reaction zone, it does not effect any decarburization of the melt. At min. 5, the pocket is basically formed and the burner/lance 11 may then be turned up to its maximum rating of 5 MW. where it is operated anywhere from 7–8 mins. because it must still clear scrap between the front of the burner/lance 11 and the iron carbon melt which is forming in the furnace 15. After the burner/lance 11 has been on its maximum rating for enough time to assist in melting the scrap, it begins a supersonic oxygen lancing mode for the last 1–3 min. of the melting cycle where effective oxygen can be delivered to the iron carbon melt in a reaction zone. If another bucket of scrap is to be melted, the process identically shown in FIG. 6 is repeated until all buckets have been melted. On the last bucket of scrap to be melted, the supersonic oxygen is continued until the amount of carbon in the iron carbon melt has been reduced to the desired level. This process can be carried out for one or more burner/lances 11.

Figure 7:
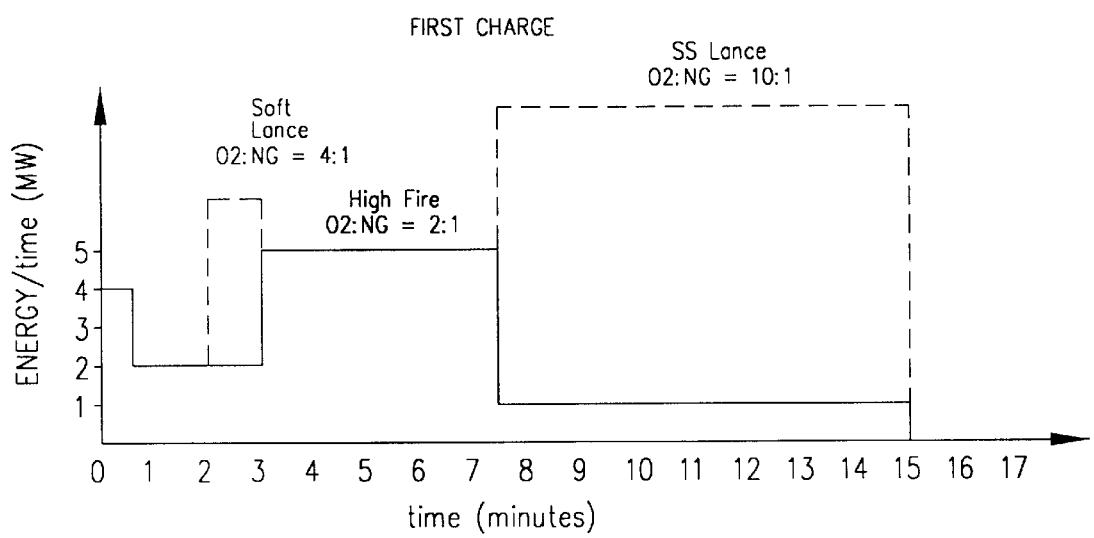
FIG. 7 is a graphical representation of the chemical energy as a function of time input by a burner/lance during the first charge of the melting phase for the steel making process of the improved burner/lance configuration illustrated in FIGS. 4 and 5.

According to the invention, the melting phase of the steel making process in FIG. 7 initiates with a similar firing of the burner/lance 10 during scrap loading to prevent clogging. After the electric arc is started, the melting process continues by producing a medium flame for mins. 1–2. Optionally, this can be accompanied by one or more soft lancings for 15–30 secs. The burner/lance 10 is then turned on to its full rated power of 5 MW during mins. 3–7.5. Because of the mounting location of the burner/lance 10, the flame does not need to melt as long a path through to the iron carbon melt and can do so quickly as compared to the side wall mounted burner/lance 11. Because of its position of firing below the step in the refractory, the burner/lance 10 may be turned on to its maximum rating sooner in the melting cycle of the furnace 15 without concerns of a flashback. Further, the burner/lance 10 melts the scrap faster because the flame is already located in a spot which is relatively hot from the application of the electric arc. In addition, the hot combustion gases rise through the rest of the unmelted scrap to transfer their heat content to it.

Supersonic oxygen is started very early in the melting cycle at min. 7.5 and continues to the completion of the cycle. The oxygen injection according to the invention can be started at this part of the melting cycle. Because of the decreased time of the flame in preparing the path for the injection and because the iron carbon melt is closer to the burner/lance 10 not as much scrap has to be melted before an effective oxygen flow can be introduced.

If a second bucket of scrap metal is to be melted, the process identically shown in FIG. 6 is repeated until all buckets have been melted. On the last bucket of scrap to be melted, the supersonic oxygen is continued until the amount of carbon in the iron carbon melt has been reduced to the desired level. This process is preferably carried out for two or more burner/lances, each having an independent reaction zone but which can be controlled together as a system with by controller 40. As will be more fully discussed hereinafter, once the carbon content of the iron carbon melt falls below the critical content amount, approximately 0.15%–0.20% carbon, then the total supersonic oxygen flow for the combined area of the reaction zones is reduced by an amount related to the carbon content.

Figure 8:
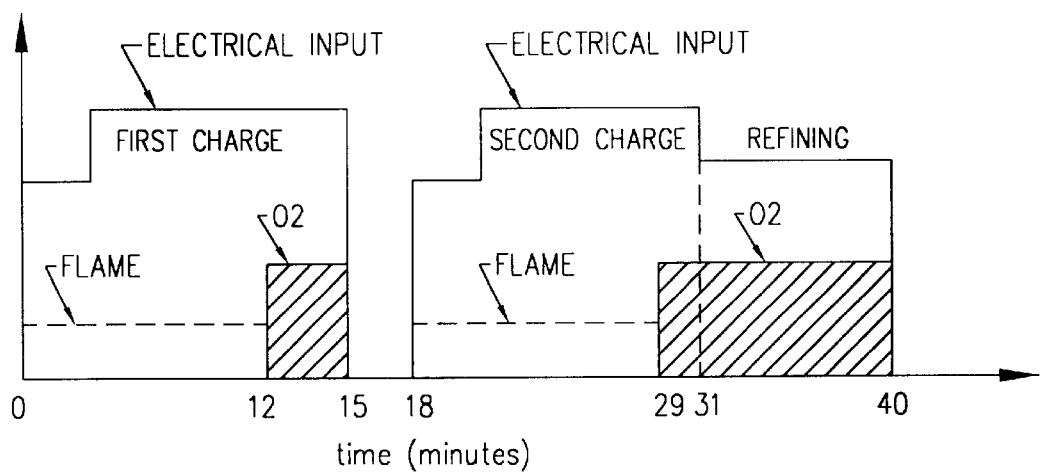
FIG. 8 is a graphical representation of the total input of electrical energy, chemical energy and oxidizing gas to an electric arc furnace as a function time for the steel making process of the conventional burner/lance configuration.

In FIG. 8, the energy input and lancing of oxidizing gas for a conventional two charge melting and decarburizing process used in steel making is shown. During the first portion of the melting cycle, the electric arc supplies electrical energy to the scrap and is aided in the melting process by the chemical energy from the combustion products of one or more burner/lances 11. The first bucket of the melting phase is split into a time when the burner/lance 11 supplies a flame and a time when it supplies lancing with an oxidizing gas. Similarly, a second bucket of scrap is melted by the electric arc and with the assistance of the combustion products of one or more burner/lances. After the melting cycle, the electric arc power is reduced and a refining and/or decarburization phase is entered. The second bucket of the melting phase is split into a time when the burner/lance 11 supplies a flame and a time when it supplies lancing with an oxidizing gas. The initiation of the lancing is limited to after a path to the iron carbon melt has been cleared and the iron carbon melt is sufficiently established such that effective lancing can take place. Once the second bucket of scrap is melted, the refining decarburization phase is entered. The lancing of oxidizing gas remains active until the desired carbon content for the product being made is reached. The lancing of the oxidizing gas is essentially a time dependent operation where a sufficient amount of oxygen must be input to chemically oxidize the amount of carbon to be removed from the iron carbon melt.

Figure 9:
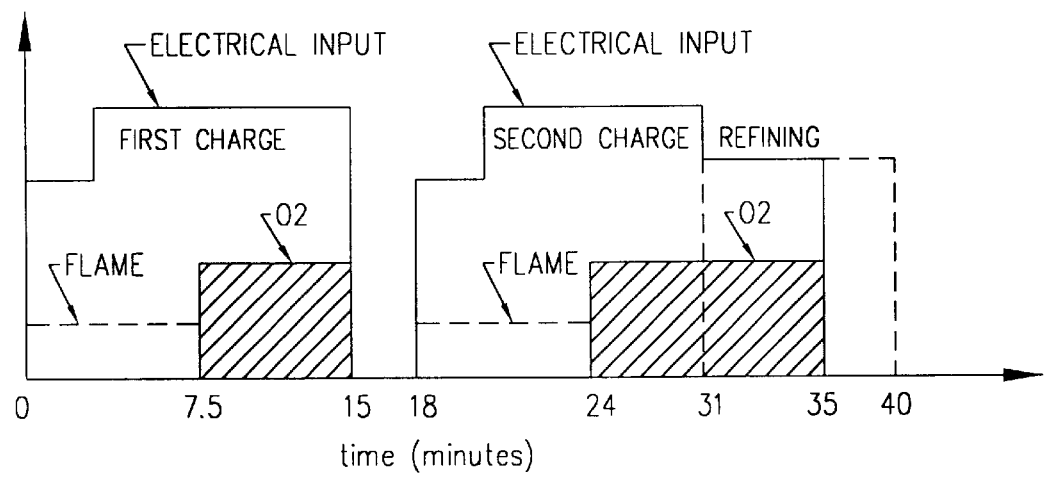
FIG. 9 is a graphical representation of the total input of electrical energy, chemical energy and oxidizing gas to an electric arc furnace as a function time for the steel making process according to one embodiment of the present invention.

FIG. 9 illustrates one embodiment of the present invention where for the same furnace and scrap burden, the lancing of the oxidizing gas can be initiated sooner in each of the two melting phases. While the conventional or side wall mounted burner/lance was able to start the oxidizing gas lancing at about 80% of the time through the each bucket of the melting phase, the present invention can begin lancing the oxidizing gas much sooner, at approximately 50% of the time through the each melting phase. The early lancing is available because of the increased effectiveness of the burner melting and the oxidizing gas lancing at this time. As is illustrated, for the same amount of oxygen lanced, the time at which decarburization ends is much sooner. The produces overall energy savings when decarburization is the process parameter that determines the end of the refining/decarburization cycle. The time the electric arc must remain on is reduced by about the same amount of time the decarburization cycle is advanced thereby saving significant energy.

In a preferred embodiment in FIG. 2, for the purpose of decarburization, four separate oxygen reaction zones have been established. The number of the multiple zones and their placement are usually suggested by the particular operation of the furnace and its configuration. Generally, increasing the number of reactions zones increases the total area over which the decarburization reaction takes place and is desirable for both phases of decarburization. Increasing the number of reaction zones makes the first phase of the decarburization process more efficient by increasing the amount of oxidizing gas which can be supplied while there is an excess demand for oxygen. This reduces the time necessary to reach the critical carbon content of the melt and begin the second phase. Increasing the number of the reaction zones particularly increases the efficiency of the second phase of decarburization where the process is dependent upon the surface kinetics of the process, particularly the mass transfer rate of the carbon. In typical furnaces of either the AC type furnace or the DC type furnace, the number of reaction zones would be a number from 2–8 independent reaction zones.

Normally the steel making process is characterized by a decarburization process in which the amount of carbon in the bath is steadily reduced by blowing oxygen into an iron carbon melt. The rate at which this can be done is the decarburization rate (−dC/dt) which is measured in points/min, where a point is 0.01%. The decarburization rate is generally flat until the critical carbon content, approximately 0.15%–0.20% of carbon is reached and then decreases relatively quickly as the carbon content and reaction kinetics become rate limiting.

The method for controlling the oxygen profile supplied during a decarburization process will now be discussed with respect to FIGS. 3 and 5. The flow controller 40 includes a program which controls the total amount of oxygen supplied from the four burner/lances 10 during the lancing operation. The oxygen profile which the controller applies is based upon the amount of carbon content of the iron carbon melt. The oxygen profile is generally split into two sections having: the first section supplying a predetermined amount of oxygen per unit time based upon the rate at which the decarburization is to take place, the amount of carbon to be removed and the time allowed for removing it, generally at about the rate of 3–6 points per minute until the critical carbon content is reached; and the second section in which the total oxygen supplied is reduced proportionally to the reduced carbon content to minimize any over oxidation of the iron carbon melt and free oxygen in the furnace atmosphere. Several embodiments for the oxygen profiling for the second section may be used by the controller 40.

A first embodiment includes the controller 40 having a program which reduces the total oxygen supplied to the multiple reaction zones after the critical carbon content is reached by turning off one or more of the burner/lances 10 supplying oxygen to the individual reaction zones 52, 54, 56 and 58.

A second embodiment includes the controller 40 having a program which reduces the total amount of oxygen supplied to the multiple reaction zones after the critical carbon content is reached by varying the duty cycle of one or more of the burner/lances 10 supplying oxygen to the individual reaction zones 52, 54, 56 and 58. These control schemes advantageously allow the supply of oxygen to more closely follow the oxygen demand of the reaction after the critical content is reached. Moreover, they are particularly advantageous for oxidizing gas injection equipment where it is either inefficient or incapable to vary the flow rate.

A third preferred embodiment includes the controller 40 having a program which reduces the total amount of oxygen supplied to the multiple reaction zones after the critical carbon content is reached by combination of turning off or varying the duty cycle of one or more of the burner/lances 10 supplying oxygen to the individual reaction zones 52, 54, 56 and 58.

A fourth embodiment includes the controller 40 having a program which reduces the total amount of oxygen supplied to the multiple reaction zones after the critical carbon content is reached by varying the flow rate of one or more of the burner/lances 10 supplying oxygen to the individual reaction zones 52, 54, 56 and 58. This control scheme is most advantageously used with oxygen injection equipment with the capability of efficiently adjusting the high velocity oxidizing gas injection flow rates.

A fifth embodiment includes the controller 40 having a program which reduces the total amount of oxygen supplied to the multiple reaction zones after the critical carbon content is reached by combination of turning off, varying the flow rate or varying the duty cycle of one or more of the burner/lances supplying oxygen to the individual reaction zones 52, 54, 56 and 58.

While the invention has been described in connection with the preferred embodiments, this specification is not intended to limit the scope of the invention to the particular forms or methods set forth, but, to the contrary, it is intended to cover any such alternatives, modifications, and equivalents as may be included within the spirit and scope of the invention as defined by the appended claims.

What is claimed is:

1. A method of melting metal and decarburizing an iron carbon melt with one or more injection apparatus in an electric arc furnace having a side wall and a refractory with a hot face for holding the iron carbon melt up to a sill line, comprising the steps of:

forming a reaction zone in the iron carbon melt;

injecting with at least one the injection apparatus a flow of combustion gas toward said reaction zone;

directing said combustion gas flow from an injection point at an injection angle such that the combustion gas flow travels along a diagonal path from the injection point to the iron carbon melt;

directing said combustion gas flow from the injection point at an injection distance such that the distance along said diagonal path from the injection point to the iron carbon melt is less than the distance along a colinear diagonal path from the side wall of the furnace to the iron carbon melt;

melting metal with said combustion gas flow along said diagonal path;

injecting with at least one of the injection apparatus a flow of oxidizing gas with a velocity high enough to decarburize the melt toward said reaction zone after the metal has been partly melted and an iron carbon melt has formed in said reaction zone;

directing said oxidizing gas flow from an injection point at an injection angle such that the oxidizing gas flow travels along a diagonal path from the injection point to the iron carbon melt;

directing said oxidizing gas flow from the injection point at an injection distance such that the distance along said diagonal path from the injection point to the iron carbon melt is less than the distance along a colinear diagonal path from the side wall of the furnace to the iron carbon melt; and such that said injection distance is less than 65" and said injection point is less than 24" vertically above the sill line of the furnace.

2. A method of melting and decarburizing an iron carbon melt as set forth in claim 1 wherein:

said injection point is less than 80% of the vertical distance from the sill line to the 24" above the sill line.

3. A method of melting and decarburizing an iron carbon melt as set forth in claim 1 wherein:

said injection point is less than the horizontal distance from the hot face of the refractory to the sidewall.

4. A method of melting and decarburizing an iron carbon melt as set forth in claim 1 wherein:

said injection point is less than 80% of the horizontal distance from the hot face of the refractory to the sidewall.

5. A method of melting and decarburizing an iron carbon melt as set forth in claim 1 wherein:

said injection point is between 0" and 24" above the sill line of the furnace.

6. A method of melting and decarburizing an iron carbon melt as set forth in claim 1 wherein:

said oxdizing gas is more than 50 vol % oxygen.

7. A method of melting and decarburizing an iron carbon melt as set forth in claim 1 wherein:

said oxidizing gas is injected at a sonic or greater velocity.

8. A method of metal melting, refining or processing for an iron carbon melt in a furnace having a side wall and a refractory with a hot face for holding the iron carbon melt up to a sill line, comprising the following steps:

forming a plurality of reaction zones for the iron carbon melt;

injecting a flow of oxidizing gas with a velocity high enough to decarburize the iron carbon melt toward each of said reaction zones from a plurality of apparatus having discharge ends mounted near an intersection of the sill line and the hot face of the refractory of the furnace; and wherein said plurality of reaction zones are evenly distrubuted around the periphery of the furnace.

9. A method of metal melting, refining or processing for an iron carbon melt as set forth in claim 8 further including the step of:

controlling the total flow of oxidizing gas based upon the carbon content of the iron carbon melt.

10. A method of metal melting, refining or processing for an iron carbon melt as set forth in claim 8 wherein:

there are four of said reaction zones.

11. A method of metal melting, refining or processing for an iron carbon melt as set forth in claim 10 wherein the method is practiced in an electric arc furnace having a slag door defining a 0 degree reference point and wherein:

a first reaction zone is located 0–90 degrees from said reference point;

a second reaction zone is located 90–180 degrees from said reference point;

a third reaction zone is located 180–270 degrees from said reference point; and a fourth reaction zone is located 270–360 degrees from said reference point.

12. A method of metal melting, refining or processing for an iron carbon melt as set forth in claim 8 wherein the method is practiced in an electric arc furnace having at least a melting phase and a refining phase, and wherein said step of injecting further includes:

injecting said flow of oxidizing gas at least partially during the melting phase of the furnace.

13. A method of metal melting, refining or processing for an iron carbon melt as set forth in claim 12 wherein said step of injecting further includes:

injecting said flow of oxidizing gas for more than 20% of the melting phase of the furnace.

14. A method of metal melting, refining or processing for an iron carbon melt as set forth in claim 12 wherein said step of injecting further includes:

injecting said flow of oxidizing gas for approximately 50% of the melting phase of the furnace.

15. A method of metal melting, refining or processing for an iron carbon melt as set forth in claim 12 wherein said step of injecting further includes:

initiating said injecting of the flow of the oxidizing gas when effective decarburization can take place in said reaction zone.

16. A method of metal melting, refining or processing for an iron carbon melt as set forth in claim 8 wherein said step of injecting further comprises:

mounting said discharge end of said apparatus at an injection angle which causes said oxidizing gas to penetrate the iron carbon melt.

17. A method of metal melting, refining or processing for an iron carbon melt as set forth in claim 16 wherein:

said injection angle is approximately 45 degrees.

18. A method of metal melting, refining or processing for an iron carbon melt as set forth in claim 8 wherein said step of injecting further comprises:

mounting said discharge end of said apparatus less than 80% of the horizontal distance from the hot face of the refractory to the sidewall.

19. A method of metal melting, refining or processing for an iron carbon melt as set forth in claim 8 wherein said step of injecting further comprises:

mounting said discharge end of said apparatus less than 80% of the vertical distance from the sill line to the 24" above the sill lime.

20. A method of metal melting, refining or processing for an iron carbon melt as set forth in claim 8 wherein said step of injecting further comprises:

mounting said discharge end of said apparatus at an intersection of the sill line and the hot face of the refractory of the furnace.

21. A method of metal melting, refining or processing for an iron carbon melt as set forth in claim 8 wherein said step of injecting further comprises:

mounting said apparatus in an enclosure.

22. A method of metal melting, refining or processing for an iron carbon melt as set forth in claim 21 wherein:

said enclosure protects said apparatus from the conditions inside the furnace.

23. A method of metal melting, refining or processing for an iron carbon melt as set forth in claim 22 wherein said enclosure further includes:

means for cooling the enclosure with a fluid.

24. A method of metal melting, refining or processing for an iron carbon melt as set forth in claim 22 wherein said enclosure further includes:

means for deflecting scrap away from said apparatus.

25. A method of metal melting, refining or processing for an iron carbon melt as set forth in claim 22 wherein said enclosure further includes:

means for forming and retaining a protective slag covering.

26. A method of metal melting, refining or processing for an iron carbon melt, as set forth in claim 8 further comprising the step of:

injecting a flow of combustion gas toward each of said reaction zones from an apparatus having a discharge end mounted near the intersection of the sill line and the hot face of the refractory of the furnace.

27. A method of metal melting, refining or processing for an iron carbon melt as set forth in claim 26 wherein the method is practiced in an electric arc furnace having at least a melting phase and a refining phase, and wherein said step of injecting a flow of combustion gas further includes:

injecting said flow of combustion gas at least partially during the melting phase of the furnace.

28. A method of metal melting, refining or processing for an iron carbon melt as set forth in claim 27 wherein said step of injecting a flow of combustion gas further includes:

injecting said flow of combustion gas less than 80% of the melting phase of the furnace.

29. A method of metal melting, refining or processing for an iron carbon melt as set forth in claim 27 wherein said step of injecting a flow of combustion gas further includes:

injecting said flow of combustion gas approximately 50% of the melting phase of the furnace.

30. A method of metal melting, refining or processing for an iron carbon melt as set forth in claim 27 wherein said step of injecting the flow of combustion gas further includes:

said injecting of the flow of the combustion gas ending when effective decarburization can take place in said reaction zone.

31. A method of metal melting, refining or processing for an iron carbon melt practiced in an electric arc furnace having a refractory with a hot face for holding molten metal up to a sill line have at least a melting phase and a refining phase comprising the following steps:

forming a plurality of reaction zones for the iron carbon melt evenly distributed around the periphery of the furnace;

providing a plurality of injection apparatus, each associated with one of said reaction zones and each being mounted by a water cooled enclosure so that a discharge end of said apparatus is mounted near an intersection of the sill line and the hot face of the refractory of the furnace and at an injection angle of approximately 45 degrees;

injecting a flow of combustion gas toward each of said reaction zones from said associated apparatus during at least part of the melting phase of the furnace until effective decarburizing can take place;

injecting a flow of supersonic oxygen toward each of said reaction zones from said associated apparatus during at least part of the melting phase and refining phase of the furnace until decarburization is complete; and controlling the total flow of supersonic oxygen supplied to said reaction zones based upon the carbon content of the iron carbon melt.

32. A method of metal melting, refining or processing for an iron carbon melt with one or more mounted injection apparatus in a furnace having a refractory with a hot face for holding molten metal up to a sill line, comprising the following steps:

forming four reaction zones for the iron carbon melt evenly distributed around the periphery of the furnace; and injecting a flow of oxidizing gas with a velocity high enough to decarburize the melt from the one or more injection apparatus toward each of said reaction zones from an apparatus having a discharge end mounted near an intersection of the sill line and the hot face of the refractory of the furnace.

33. A method of metal melting, refining or processing for an iron carbon melt as set forth in claim 32 further including the step of:

controlling the total flow of oxidizing gas based upon the carbon content of the iron carbon melt.

34. A method of metal melting, refining or processing for an iron carbon melt as set forth in claim 32 wherein the method is practiced in an electric arc furnace having a slag door defining a 0 degree reference point and wherein:

a first reaction zone is located 0–90 degrees from said reference point;

a second reaction zone is located 90–180 degrees from said reference point;

a third reaction zone is located 180–270 degrees from said reference point; and a fourth reaction zone is located 270–360 degrees from said reference point.

* * * * *